United States Patent [19]

Toyonaga

[11] Patent Number: 4,521,878

[45] Date of Patent: Jun. 4, 1985

[54] DATA TRANSMITTING-RECEIVING SYSTEM

[75] Inventor: Noriyasu Toyonaga, Otawara, Japan

[73] Assignee: Fujitsu Limited, Kawasaki, Japan

[21] Appl. No.: 462,113

[22] Filed: Jan. 28, 1983

[30] Foreign Application Priority Data

Jan. 28, 1982 [JP] Japan ................................. 57-12024
Dec. 9, 1982 [JP] Japan ................................ 57-214657

[51] Int. Cl.³ ........................................... H04J 11/00
[52] U.S. Cl. ..................................... 370/19; 370/20; 375/39; 375/40; 455/60
[58] Field of Search ..................... 455/60; 375/39, 40; 370/19, 20; 343/361, 362, 363, 364, 365

[56] References Cited

U.S. PATENT DOCUMENTS

| | | | |
|---|---|---|---|
| 3,735,266 | 5/1973 | Amitay | 455/60 |
| 3,978,407 | 8/1976 | Forney, Jr. et al. | 375/39 |
| 4,112,370 | 9/1978 | Monsen | 343/361 |
| 4,123,710 | 10/1978 | Stuart et al. | 375/39 |
| 4,146,893 | 3/1979 | Inagaki et al. | 455/60 |
| 4,220,923 | 9/1980 | Pelchat et al. | 455/60 |
| 4,231,037 | 10/1980 | Long | 343/361 |
| 4,347,616 | 8/1982 | Murakami | 370/20 |
| 4,355,397 | 10/1982 | Stuart | 370/20 |

FOREIGN PATENT DOCUMENTS 53-2023  1/1978  Japan ................................. 370/19

OTHER PUBLICATIONS

"Measurements of the Effects of Propagation on Digital Radio Systems Equipped with Space Diversity and Adaptive Equalization", Thomas S. Giuffrida, Bell Telephone Laboratories, Holmdel, New Jersey, pp. 48.1.1–48.1.6, 1979.
"Adaptive Equalization for Digital Microwave Radio Systems", Paul Hattmann et al., Rockwell International, 1980, pp. 8.5.1–8.5.6.
"An Automatic Transversal Equalizer in Microwave Digital Radio System", Masaharu Araki et al., Yokosuka Electrical Communication Laboratory, pp. 1131–1138.
"200 MB/S 16-QAM Digital Radio System with New Countermeasure Techniques for Multipath Fading", Takehiro Murase et al., Yokosuka Electrical Communication Laboratory, 1981, pp. 46.1.1–46.1.5.
"Transmission Lines, Components, and Devices", Merrill I. Skolnik, Radar Handbook, pp. 8-20–8-25.
"Data Transmission", William R. Bennett et al., Inter-University Electronics Series, vol. 2, pp. 204–208.
Electronics Dictionary, John Markus, pp. 558–559, 565–567.
Communications Standard Dictionary, Martin H. Weik, D.Sc., pp. 680–681.

Primary Examiner—Joseph A. Orsino, Jr.
Attorney, Agent, or Firm—Staas & Halsey

[57] ABSTRACT

A data transmitting-receiving system, in the transmitter of which, digital modulations are applied to a vertically (V) polarized wave carrier and a horizontally (H) polarized wave carrier. The V- and H-polarized waves have the same frequency and are in synchronism with each other and the digital modulations are achieved in accordance with data to be transmitted supplied via two separate routes. Thus, a plurality of coded points corresponding to data are distributed in a three dimensional space and transmitted to a receiver. The receiver receives the coded points distributed in a three dimensional space and then reproduces the transmitted data therein.

11 Claims, 11 Drawing Figures

DATA TRANSMITTING-RECEIVING SYSTEM

BACKGROUND OF THE INVENTION

1. Fields of the Invention

The present invention relates to a data transmitting-receiving system, more particularly, to a system in which data is transmitted by application of digital modulation to a carrier in a transmitter and in which the thus modulated data is demodulated in a receiver.

2. Description of the Prior Art

The usual methods readily available for commercial use for digital modulation are phase shift keying (PSK), quadrature amplitude modulation (QAM), and so on. These methods have made it possible to achieve high speed transmission of enormously large volumes of data.

In these methods, the carrier is modulated in the phase component and/or amplitude component thereof by the data to be transmitted. Considered schematically, therefore, the coded points corresponding to data may be thought of as being distributed on a plane. There are, however, many phases for modulation and/or many amplitudes for modulation in these modulation methods. This makes the modulator and demodulator complicated in design. These modulation methods are therefore not so preferable from the technical and economic standpoints.

In prior art frequency division multiplex radio communication systems, it has been known to alternate the channels between vertically (V) polarized waves and horizontally (H) polarized waves to obtain close channel allocation to make effective use of the frequency band. Thus, to increase data transmission capacity, it should be possible to allocate channels having V-polarized waves and H-polarized waves as their carriers in the same frequency area. In practice, however, simply setting channels using V- and H-polarized waves in the same frequency area is not sufficient for realization of a practical radio communication system since undesired interference occurs between the V- and H-polarized wave channels due to reduced cross polarization discrimination.

SUMMARY OF THE INVENTION

It is an object of the present invention to provide, in view of the above, a data transmitting-receiving system in which many coded points can easily be transmitted from technical and economic viewpoints and, thereby, to allow an increase in the data transmission capacity.

The above object is attained by the following. In a transmitter, digital modulations are applied to the V-polarized wave carrier and the H-polarized wave carrier in which V- and H-polarized waves have the same frequency and are in synchronism with each other. The digital modulations are achieved in accordance with data to be transmitted supplied via two separate routes. Thus, a plurality of coded points corresponding to data are distributed in a three dimensional space and are transmitted to a receiver. The receiver receives the coded points and reproduces the transmitted data therein.

According to the present invention, therefore, a unique digital modulation method is provided in which both the V-polarized wave signal and H-polarized wave signal are effectively utilized.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Figure 1:
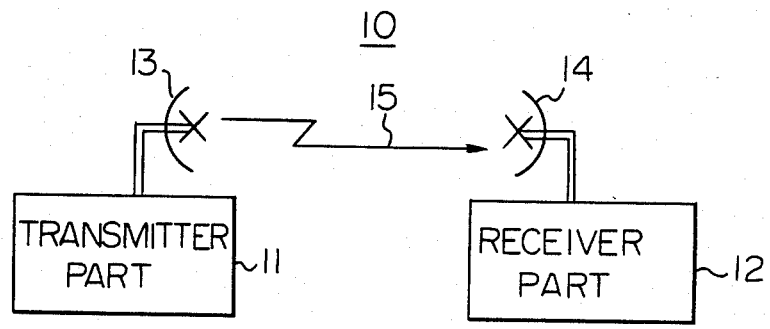
FIG. 1 is a schematic view of a known data transmitting-receiving system to which the present invention is adapted.

FIG. 1 is a schematic view of a known data transmitting-receiving system 10 to which the present invention is adapted. In FIG. 1, reference numeral 11 represents a transmitter part and 12 represents a receiver part. Data transmission and reception are performed over a line of transmission 15 between an antenna 13 and an antenna 14. Although only a one-way line 15 from the transmitter to the receiver is illustrated in this figure, two-way lines actually exist in the system of FIG. 1. Further, each of the antennas 13 and 14 is so constructed as to deal with both the V- and H-polarized waves commonly, i.e., each is constructed as a common V·H-polarized wave antenna.

The data-transmitting-receiving system 10 which utilizes a pair of such common V·H-polarized wave antennas has been widely known. For example, there is a data transmitting-receiving system which is operated under a polarization diversity method for the purpose of suppressing a signal fading phenomena. Further, there is a system employing common V·H-polarized wave antennas which utilizes both the V-polarized wave and the H-polarized wave for the purpose of, as previously mentioned, increasing the number of multiplex channels. These existing data transmitting-receiving systems differ from the data transmitting-receiving system of the present invention basically in view of the signal mode created on the transmission line.

Figure 2:
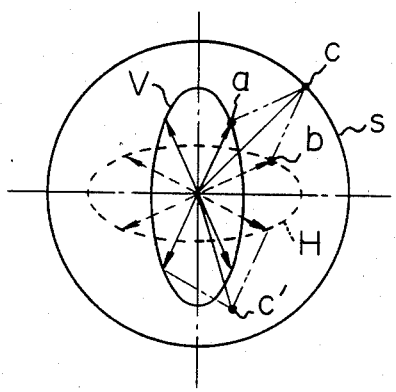
FIG. 2 is a perspective schematic view of a signal mode developed on the line of transmission 15 in FIG. 1.

FIG. 2 is a perspective schematic view of a signal mode created by the present invention on the line of transmission 15 in FIG. 1. Assuming that each data to be transmitted is transmitted in a form of 16 coded points distributed in a three dimensional space, digital phase modulation of four phases is applied to each of the V-polarized wave carrier and the H-polarized wave carrier, which carriers have the same frequency and are in synchronism with each other. Thereafter, the digital-phase-modulated V- and H-polarized wave carriers are combined with each other and then transmitted to the receiver part. In FIG. 2, a solid line V represents a plane of the V-polarized wave to which the digital phase modulation of four phases is applied. A broken line H represents a plane of the H-polarized wave to which a modulation identical to the above modulation is applied. The planes V and H are orthogonal to each other. Thus, it is possible to add a vector defined by a coded point "a" located on the plane of the V-polarized wave with a vector defined by a coded point "b" located on the plane of the H-polarized wave, so that the resultant vector addition of "a" and "b" can be represented by a vector defined by a coded point "c" located in a spherical space S. Similarly, another resultant vector addition can be represented by another vector defined by, for example a coded point "c'". Accordingly, 16 coded points (c) in all can be defined on the spherical space by combinations of, for example, coded point (a) on the plane of the V-polarized wave with, for example, coded point (b) on the plane of the H-polarized wave in synchronism with the above V-polarized wave. In the receiver, the original data can be reproduced by distinguishing the 16 coded points distributed in the three dimensional space S from each other.

Figure 3:
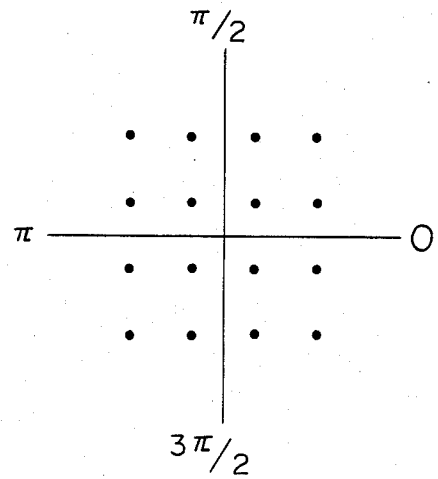
FIG. 3 is a view of a distribution of coded points which are obtained under a prior art quadrature amplitude modulation method specifying, for example, 16 coded points in all.

FIG. 3 is a view representing a distribution of coded points obtained under a prior art QAM method specifying, for example, 16 coded points in all. As seen from FIG. 3, in the prior art, it is required to discriminate one coded point between 16 coded points distributed on a two dimensional plane. In the present invention, however, such discrimination is made between 16 coded points distributed in a three dimensional space. Discrimination between coded points distributed in a three dimensional space, as in the present invention, is clearly easier technically and economically and results in fewer data errors, compared with discrimination between coded points distributed on a two dimensional plane, as in the prior art. This will also be clear from the simple hardware construction according to the present invention, mentioned hereinafter.

Furthermore, according to the data transmitting-receiving system of the present invention, it is easy to compensate for the aforementioned inter-symbol interference occurring between channels due to cross signals induced between the V- and H-polarized waves. This is because, in the system of the present invention, the carrier is composed of a V-polarized wave and an H-polarized wave having the same frequency as the V-polarized wave and in synchronism with the H-polarized wave. Since the V-polarized wave is in synchronism with the H-polarized wave, the technique used in conventional transversal equalizers employed in conventional signal transmission through a monopolarized wave can be directly applied to compensation of inter-symbol interference between the V- and H-polarized wave signals in the present invention.

Although the above explanations were made based on data transmission using four phase modulation applied to each of the V- and H-polarized wave carriers, it would be recognized by one of skill in the art that data transmission is also possible using eight phase modulation applied to each of the V- and H-polarized wave carriers, in which 64 coded points are distributed in the spherical space S, whereby large capacity data transmission can be realized. If QAM specifying 16 coded points is used for modulating each of the V- and H-polarized wave carriers, it is possible to distribute 256 coded points in all in the spherical space S.

Figure 4:
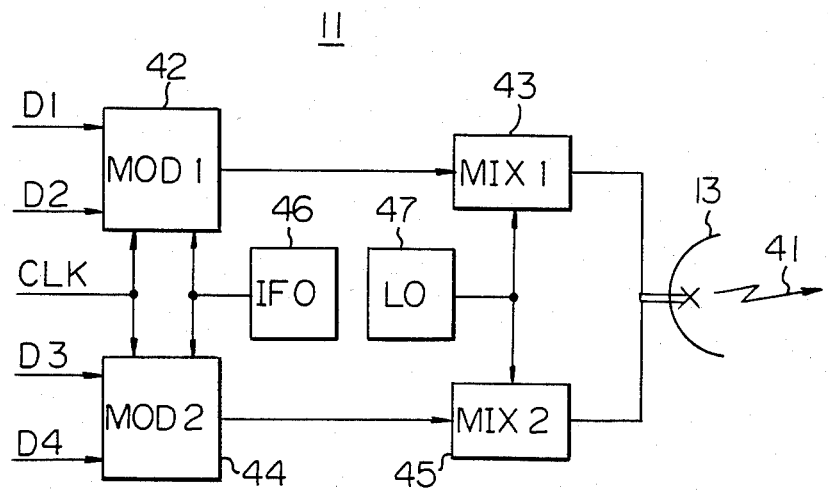
FIG. 4 is a block diagram of a transmitter part of FIG. 1, according to the present invention.

FIG. 4 is a block diagram of the transmitter 11 of FIG. 1, according to the present invention. In FIG. 4, data D1 and D2 of one two-channel pair and data D3 and D4 of another two-channel pair are output from the aforesaid common V·H-polarized wave antenna 13 as a vector addition wave 41 composed of the V-polarized wave (refer to V in FIG. 2) and the H-polarized wave (refer to H in FIG. 2). First, the data D1 and D2 are modulated by a modulation circuit (MOD1) 42, then converted into a radio frequency signal by a frequency conversion circuit (MIX1:mixer 1) 43 and further supplied to the antenna 13. These circuits 42 and 43 form part of the transmitter for the V-polarized wave side. The transmitter for the H-polarized wave side similarly includes a modulation circuit (MOD2) 44 and a frequency conversion circuit (MIX2) 45 through which the carrier modulated by the data D3 and D4 is supplied to the antenna 13.

The modulation circuits 42 and 43 perform separate logical processings for the data D1, D2 and D3, D4, respectively, but are commonly driven by a single clock source producing a clock signal CLK. The modulation circuits 42 and 43 are also commonly driven by a single intermediate frequency oscillation circuit (IFO) 46. Modulations are achieved in the modulation circuits 42 and 43 in accordance with the thus logical processed signals D1, D2 and D3, D4, respectively. Here, the above-mentioned logical processing for each of the data D1, D2 and D3, D4 can be realized by employing, for example a known differential code conversion method and the modulation is achieved here, as an example, by the conventional four phase modulation method (embodiment of FIG. 2).

The frequency conversion circuits 43 and 45 for producing the V-polarized modulation wave and the H-polarized modulation wave, respectively, are commonly driven by a single local oscillation circuit (LO) 47.

In the present invention, the V-polarized wave signal and the H-polarized wave signal are not processed independently from each other, but are dealt with as a combined transmission signal in the form of the vector addition wave 41. Accordingly, both the V-polarized wave side transmitter and the H-polarized wave side transmitter must be commonly driven by the single clock signal CLK, the signal intermediate frequency oscillation circuit 46, and the single local oscillation circuit 47. This additionally makes the transmitter part 11 of FIG. 4 advantageous economically. It should be noted that the concept of a common drive for both the V- and H-polarized wave sides is also applied to the receiver 12 (FIG. 1), as mentioned hereinafter.

Figure 5:
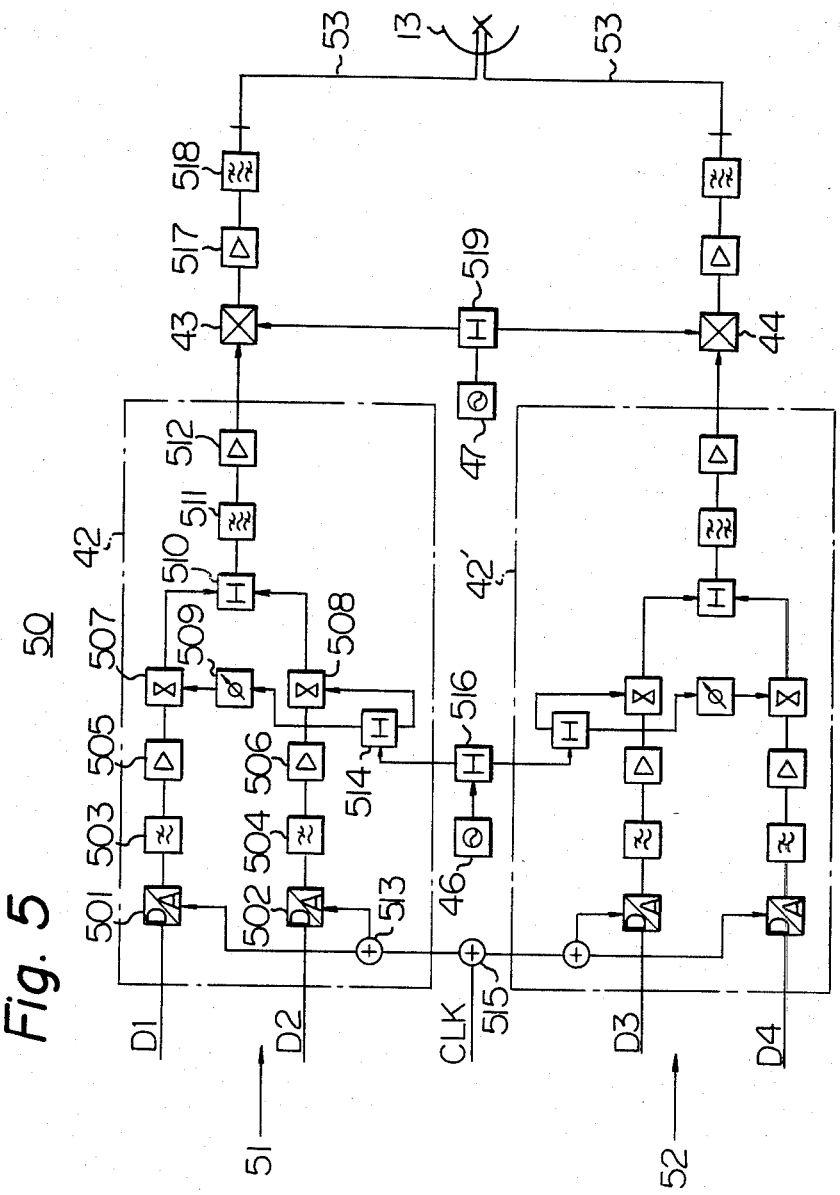
FIG. 5 is a circuit diagram of one example of the transmitter unit shown in FIG. 4.

FIG. 5 is a circuit diagram of one example of the transmitter 11 shown in FIG. 4. In FIG. 5, members or elements the same as those of preceding figures are represented by the same reference numerals or symbols. A transmitting apparatus 50 of FIG. 5 may be basically broken down into a V-polarized wave side transmitter 51 and an H-polarized wave side transmitter 52. The outputs therefrom are transmitted to the antenna 13 by way of waveguides 53.

In the transmitter 51, the two channel data D1 and D2 of the first route are input to the modulation circuit 42. There, modulation is performed under, for example, the four phase modulation method in response to data D1 and D2. The modulation circuit 42 comprises, as shown in FIG. 5, digital-to-analog (D/A) converters 501, 502, low pass filters (LPF) 503, 504 for applying band restrictions to the output signals from the D/A converters, amplifiers (AMP) 505, 506, phase modulation circuits (PM) 507, 508, a hybrid circuit 510 for adding the output signals from the circuits 507, 508 to each other, a band pass filter (BPF) 511 for applying a predetermined band restriction to the output signal from the circuit 510, an intermediate frequency amplifier 512, a branching unit 513 which receives the clock signal CLK from a branching unit 515 (shown at center left of the drawing) and supplies it to both the D/A converters 501, 502, a hybrid circuit 514 which receives, via a hybrid circuit 516, the intermediate frequency signal from the intermediate frequency oscillation circuit 46 and branches it, and a phase shifter 509 which shifts the phase by 90° of one of the branched outputs from the hybrid circuit 514.

The above description of the modulation circuit 42 is also true for modulation circuit 42' for processing the two channel data D3 and D4 in the second route. It should be noted that the modulation circuits 42 and 42' are driven commonly by the single clock CLK and by the single intermediate frequency oscillation circuit 46.

In the transmitter 51, the output from the modulation circuit 42 is mixed with the output from the local oscillation circuit 47 by means of the frequency conversion circuit 43. The mixed signal is input via a radio frequency amplifier 517 to a band pass filter (BPF) 518 in which a band restriction is applied. Thereafter, the output from the filter 518 is transmitted, via the waveguide 53, to the antenna 13.

The above description of the transmitter 51 is also true for the other transmitter 52 for processing the two channel data D3 and D4 of the second route. It should be noted that the transmitters 51 and 52 are driven commonly by the output from the local oscillation circuit 47 via the hybrid circuit 519.

Figure 6A:
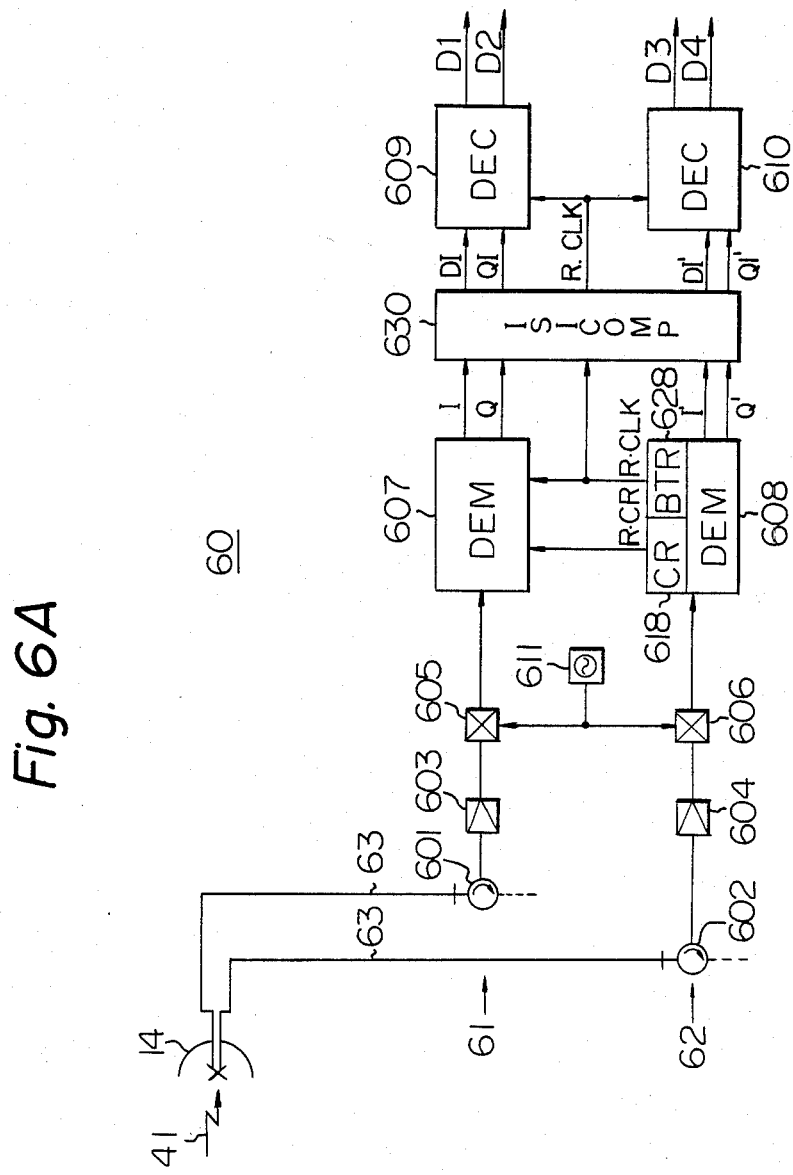
FIG. 6A is a circuit diagram of one example of a receiver unit shown in FIG. 1.

FIG. 6A is a circuit diagram of one example of the receiver 12 shown in FIG. 1. A receiving apparatus 60 of FIG. 6A may be basically broken down into a V-polarized wave side receiver 61 and an H-polarized wave side receiver 62. These receivers 61 and 62 have the same construction. First, the vector addition wave 41 received at the common V·H polarized wave antenna 14 is input, on one hand, as the V-polarized wave, via one of waveguides 63 and a circulator 601, to the receiver 61 and, on the other hand, as the H-polarized wave, via the other of the waveguides 63 and a circulator 602, to the receiver 62. It should be understood that since these receivers have the same construction, except for a carrier recovery circuit (CR) 618 and a bit timing recovery circuit (BTR) 628, both of which will be explained hereinafter, the following explanations are made only with respect to the receiver 61 shown in the upper half of the drawing. The output from the circulator 601 (circulator 602) is applied, via an amplifier 603 (amplifier 604), for example a low noise amplifier, to a frequency conversion circuit 605 (frequency conversion circuit 606) in which the output from the amplifier 603 is mixed with the output from an oscillation circuit 611. Thereby, an intermediate frequency signal is produced therefrom. The intermediate frequency signal is demodulated by a demodulation circuit (DEM) 607 (demodulation circuit 608) and then applied to a decoder (DEC) 609 comprised of, for example, a differential logical processing circuit. Thereby, the original data D1 and D2 are reproduced.

The above description of the receiver 61 is true for the receiver 62, however, the frequency conversion circuits 605 and 606 are driven commonly by the output of the single local oscillation circuit 611. Further, both reference carrier recovery and bit timing signal extraction (recovery) are achieved by either one of the receivers 61 and 62. The recovered reference carrier and the recovered bit timing signal are, however, commonly utilized by these receivers. In FIG. 6A, the CR 618 and the BTR 628 are mounted at the receiver 62 side to obtain a reproduced carrier (R·CR) and reproduced clock signal (R·CLK). The R·CLK is, on other hand, also commonly used by the DEC's 609 and 610 mounted in the receivers 61 and 62, respectively.

Further, the receiving apparatus 60 includes therein an inter-symbol interference compensating circuit 630 which is effective for suppressing inter-symbol interference due to the cross signal penetrating from the V-polarized wave side to the H-polarized wave side and vice versa.

The following three types of inter-symbol interference may be considered to exist assuming, with reference to FIG. 4, the data D1 and D2 are transmitted in an I (inphase)-channel and a Q (quadrature)-channel, respectively, and the data D3 and D4 are transmitted in an I'-channel and a Q'-channel, respectively:

1. Interference from the preceding bit signal or the following bit signal in the same channel, i.e., I, Q, I', Q' channel;
2. Interference between the I and Q channels, i.e., I$\rightleftarrows$Q or the I' and Q' channels, i.e., I'$\rightleftarrows$Q'; and
3. Interference between the V- and H-polarized waves, i.e., V$\rightleftarrows$H.

The above relationships can be expressed in a matrix form, as shown below.

|   |     | V |       | H |         |
|---|-----|---|-------|---|---------|
|   |     | I | Q     | I' | Q'     |
| V | I   | $II^{(A)}$ | $IQ^{(B)}$ | $II'^{(C)}$ | $IQ'^{(C)}$ |
|   | Q   | $QI^{(B)}$ | $QQ^{(A)}$ | $QI'^{(C)}$ | $QQ'^{(C)}$ |
| H | I'  | $I'I^{(C)}$ | $I'Q^{(C)}$ | $I'I'^{(A)}$ | $I'Q'^{(B)}$ |
|   | Q'  | $Q'I^{(C)}$ | $Q'Q^{(C)}$ | $Q'I'^{(B)}$ | $Q'Q'^{(A)}$ |

In the above matrix, symbol (A) denotes the interference of case 1, (B) of case 2, and (C) of case 3. The interference volume can be reduced by discriminating the interference volume of each item in the above matrix and then by compensating for each discriminated interference volume. Of these symbols (A), (B), and (C), each of the items represented by the symbols (C) especially expresses the interference between the V- and H-polarized waves, i.e., V$\rightleftarrows$H. Accordingly, the previously mentioned inter-symbol interference due to the cross signals between the V- and H-polarized waves can be suppressed by compensating for the interference volume of each item in the above matrix having the symbol (C).

Figure 6B:
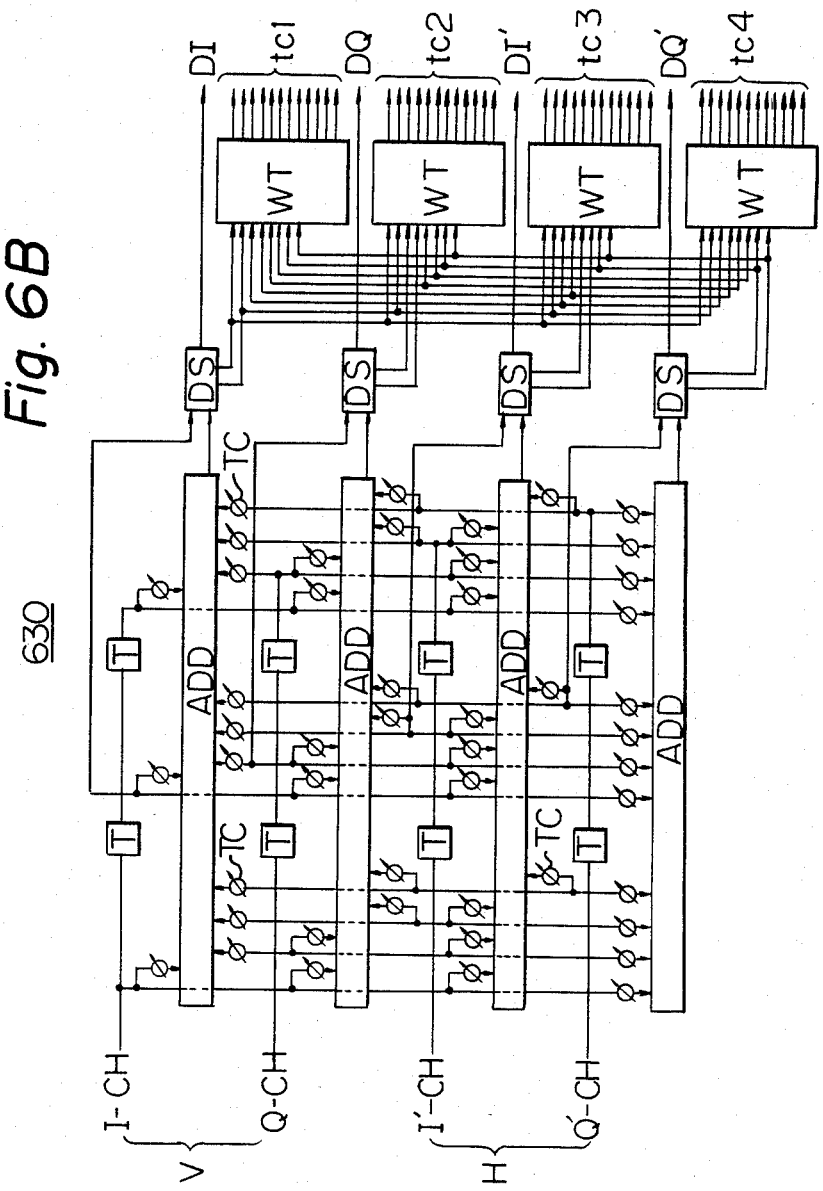
FIG. 6B is a circuit diagram of one example of an integrated compensation circuit 630 shown in FIG. 6A.

FIG. 6B is a circuit diagram of one example of the circuit 630 shown in FIG. 6A. As seen from FIG. 6A, the circuit 630 is basically a so-called transversal equalizer, more specifically, a four dimensional transversal type automatic equalizer. The V-polarized wave signal from the demodulation circuit (DEM) 607 in FIG. 6A is contained in the I-channel (I-CH) and the Q-channel (Q-CH) shown in FIG. 6B. Similarly, the H-polarized wave signal from the demodulation circuit (DEM) 608 in FIG. 6A is contained in the I'-channel (I'-CH) and the Q'-channel (Q'-CH) shown in FIG. 6B.

In FIG. 6B, each block T represents a delay circuit, each block ADD represents an adder, symbol TC denotes a tap coefficient setting circuit, each block DS is a decision circuit, and each block WT is a weighting control circuit. In each decision circuit DS, the interference volume defined by a polarity and an absolute value is determined. In the weighting control circuits WT, tap coefficients tc1 through tc4 are so determined as to minimize the interference volume. The values of tc1 through tc4 are applied to the tap coefficient setting circuits via feedback paths (not shown). Symbols DI, DQ, DI', DQ' denote data signals of corresponding channels, which data signals have the least interference volumes. Data signals DI, DQ and DI', DQ' are applied to the logical processing circuits (DEC) 609 and 610 of FIG. 6A, respectively. It should be understood that the logical processing circuits 609 and 610 can be comprised of, as previously mentioned, differential logical processing circuits. However, they can also be realized by other circuits, for example, ordinary logical processing circuits.

Figure 7:
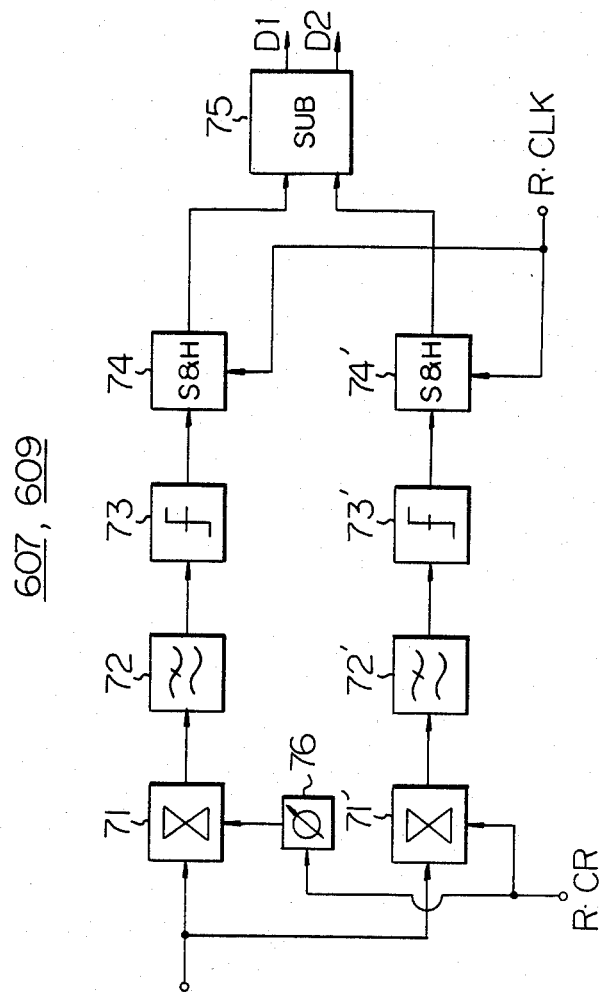
FIG. 7 is a circuit diagram of one example of a demodulation circuit and decoder shown in FIG. 6A.

FIG. 7 is a circuit diagram of one example of the demodulation circuit (DEM) 607 and the decoder (DEC) 609 shown in FIG. 6A. It should be understood that the aforementioned inter-symbol interference compensating circuit 630 is omitted from FIG. 7 for brevity. It is, however, mentioned in detail with reference to FIG. 6B. Further, DEM 608 and DEC 610 have the same detailed circuit diagram as that of FIG. 7. The circuit of FIG. 7 is so constructed as to operate under four phase modulation, as an example.

In FIG. 7, the intermediate frequency signal from the frequency conversion circuit 605 (refer to FIG. 6A) is applied to both orthogonal detection circuits 71 and 71'. The single reproduced carrier R·CR (refer to FIG. 6A) is applied to both these circuits 71 and 71'. Reference numeral 76 represents a phase shifter. Thereafter, undesired noise is removed from the outputs of the circuits 71 and 71' by means of low pass filters 72 and 72', respectively. Then, the filtered outputs are converted into digital signals by means of rectangular wave conversion circuits 73 and 73'. The remaining circuits of FIG. 7 are identical to the differential logical processing circuit (DEC) 609 shown in FIG. 6A, which circuit 609 and the circuit 610 commonly use the single reproduced clock signal R·CLK (refer to FIG. 6A) to drive sample and hold circuits (S and H) 74 and 74' by which the digital signals are sampled and held. These sampled and held signals are applied to a subtractor 75. Thus, the reproduced data D1 and D2 are finally obtained after applying differential logical processing thereto in the subtractor 75.

Figure 8A:
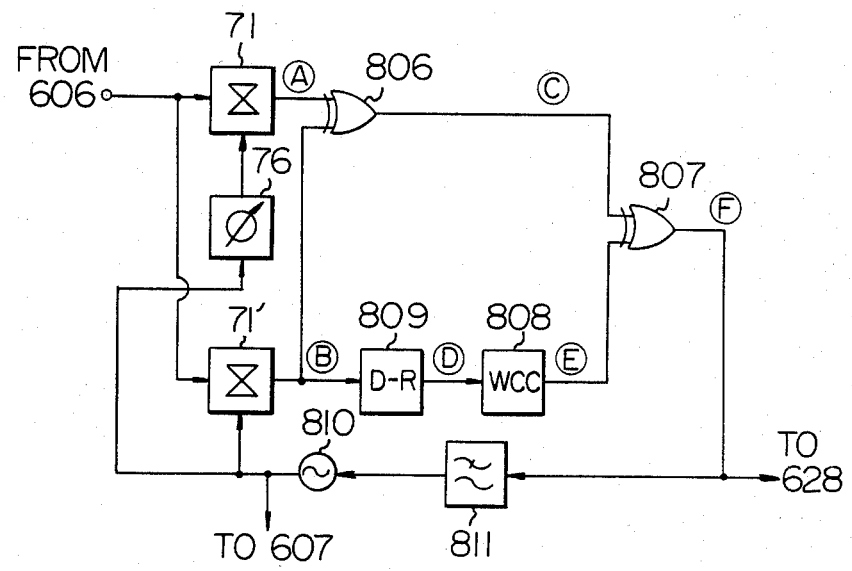
FIG. 8A is a circuit diagram of one example of a carrier recovery circuit 618 shown in FIG. 6A.
Figure 8B:
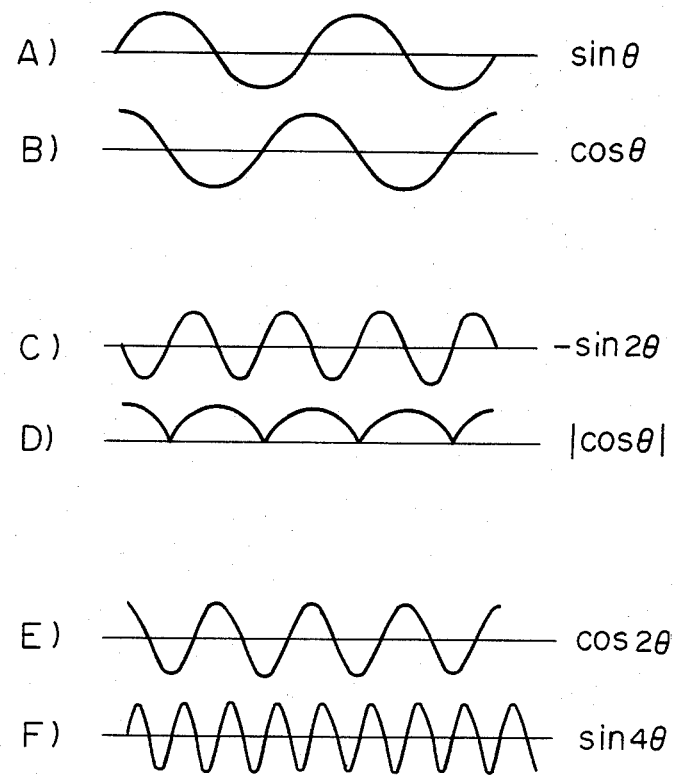
FIG. 8B depicts waveforms of signals appearing at portions in FIG. 8A.

FIG. 8A is a circuit diagram of one example of the carrier recovery circuit (CR) 618 shown in FIG. 6A. The construction of the CR is not limited to that shown in this figure. The CR may be constructed by other known circuits. The meanings and functions of reference numerals 606, 607, 628, the orthogonal detection circuits 71, 71', and the phase shifter 76 in FIG. 8A have already been explained. The CR also comprises exclusive OR (EXOR) circuits 806, 807, a waveform conversion circuit (WCC) 808, a detection-rectification circuit (D-R) 809, a low pass filter (LPF) 811, and a voltage controlled oscillator 810. The operation of the circuit CR shown in FIG. 8A will be clarified with reference to waveforms appearing at main portions therein. FIG. 8B depicts waveforms of signals appearing at portions (A) through (F) in FIG. 8A. In FIG. 8B, rows A through F correspond to portions (A) through (F) in FIG. 8A, respectively. Symbols "sin" or "cos" are added to the rows for reference and denote functions of the respective waveforms.

Figure 9:
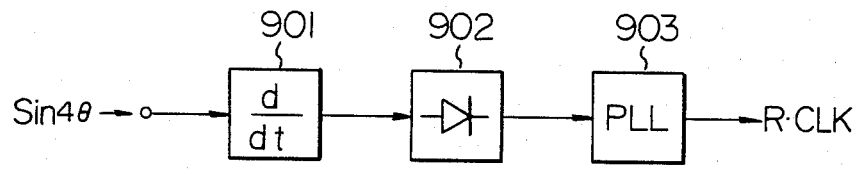
FIG. 9 is a circuit diagram of one example of a bit timing recovery circuit 628 shown in FIG. 6A.

FIG. 9 is a circuit diagram of one example of the bit timing recovery circuit (BTR) 628 shown in FIG. 6A. In FIG. 9, symbol sin 4$\theta$ represents an output from the carrier recovery circuit of FIG. 8A. The reproduced clock signal R·CLK can be derived from this output sin 4$\theta$. Reference numeral 901 represents a differentiation circuit, 902 a rectification circuit, and a 903 a digital phase-locked loop (PLL) circuit.

Thus, in the receiver part 12, a demodulation can be achieved by receiving both the V-polarized wave and the H-polarized wave by a reverse operation of the transmitter part. In this case, it should be noted that since both the V- and H-polarized waves have the same frequency and are in synchronism with each other, the inter-symbol interference therebetween can very easily be compensated.

As mentioned above in detail, according to the present invention, each coded point on one two dimensional plane and each coded point on the other two dimensional plane orthogonal thereto are added in a vector so as to distribute each additive coded point in the three dimensional space. Therefore, it is possible to create, with a conventional modulation technique for producing coded points on the two dimensional plane, a number of allocations of various coded points in the space equal to the product of the number of the allocations defined on one of the two dimensional planes and the number of the allocations defined on the other of the two dimensional planes. This largely increases the data transmission capacity. In this case, the V-polarized wave from one modulation route and the H-polarized wave from the other modulation route are separately produced. However, these modulation routes are driven by a single clock signal and with the same frequency. Accordingly, these two modulation routes can be driven by a single clock signal, a single carrier signal, and a single intermediate wave signal, which is advantageous from an economic viewpoint. Assuming that each of the modulation routes is operated under, for example, a four phase modulation method, 16 coded points can be obtained in the three dimensional space, i.e., the same number of points as obtained with a prior art QAM method of 16 values. Comparing the method of the present invention with the prior art method, the carrier/noise (C/N) for obtaining the same bit error rate is about 7 dB better in the present invention. Further, the so-called backoff of a high frequency power amplifier under the four phase modulation method in the present invention is generally in a range between 3 and 4 dB, while the backoff under the 16 values QAM method is generally in a range betwween 5 and 7 dB. Thus, the high frequency power amplifier employed in the present invention can operate with a high efficiency.

Furthermore, the inter-symbol interference induced by the cross signal between the V-polarized wave signal and the H-polarized wave signal can eaily be compensated for by utilizing a conventional technique for a transversal equalizer. Therefore, the original data can be reproduced correctly.

The present invention is also useful for utilizing a limited frequency band with high efficiency. Also, it is possible to increase the data transmission capacity without sacrificing economy.

I claim:

1. A data transmitting-receiving system comprising a transmitter unit, for transmitting two channels of data derived from a first route and two channels of data derived from a second route, and a receiver unit, for receiving, via a radio transmission line, said data, said transmitter unit comprising a transmitting apparatus generating a carrier from which is produced both a vertically (V) polarized wave and a horizontally (H) polarized wave each having the same frequency and in synchronism with each other and said V- and H-polarized waves being produced respectively according to said data from the first and second routes, the transmitting apparatus outputting a vector addition wave defined by both the modulated V- and H-polarized waves, and said receiver unit comprising a receiving apparatus receiving and dividing said vector addition wave into received V- and H-polarized waves, demodulating the V- and H-polarized waves, suppressing interference between the demodulated V- and H-polarized waves, between channels within each demodulated polarized wave and within data into a channel, and reproducing the original data of said first and second routes.

2. A system as set forth in claim 1,
wherein said transmitting apparatus receives a single clock signal and comprises a single oscillation source, a V-polarized wave side transmitter and an H-polarized wave side transmitter, both transmitters operatively connected to receive the single clock signal and to said single oscillation source, both clocked in synchronism with each other by using commonly the single clock signal, and one transmitter modulating therein a vertical side carrier and the other transmitter modulating therein a horizontal side carrier in accordance with said data of the first and second routes, respectively, the vertical side and horizontal side carriers haing the same frequency produced from said single oscillation source and being combined and polarized after modulation; and
wherein said receiving apparatus comprises a single clock signal generator for generating a single reproduced clock signal, a single carrier recovery circuit for generating a single reproduced reference carrier, and a V-polarized wave side receiver and an H-polarized wave side receiver, both receivers operatively connected to said single clock signal generator and said single carrier recovery circuit, both driven commonly by the single reproduced clock signal, and the two receivers demodulate therein received signals by using the single reproduced reference carrier.

3. A system as set forth in claim 2, wherein said receiving apparatus further comprises an inter-symbol interference compensating circuit, operatively connected to the demodulated outputs of said V-polarized wave side receiver and said H-polarized wave side receiver, for suppressing inter-symbol interference between the V-polarized wave and the H-polarized wave, for suppressing interference between adjacent bits, and for suppressing interference between in-phase and quadrature phase channels on each side.

4. A system as set forth in claim 3, wherein said inter-symbol interference compensating circuit is a transversal type automatic equalizer.

5. A system as set forth in claim 3,
wherein said transmitting apparatus further comprises a transmitting side single local oscillation circuit, operatively connected to said V-polarized wave side transmitter and said H-polarized wave side transmitter, an output from said transmitting side single local oscillation circuit being used by both transmitters to generate therein respective radio frequency signals, and
wherein said receiving apparatus further comprises a receiving side single local oscillation circuit operatively connected to said V-polarized wave side receiver and said H-polarized wave side receiver, both receivers using commonly an output from said receiving side single local oscillation circuit to generate therein respective intermediate frequency signals.

6. A system as set forth in claim 5, wherein either one of said V- and H-polarized wave side receivers generates said single reproduced clock signal and also said single reproduced reference carrier, and the single reproduced clock signal and the single reproduced reference carrier are commonly used by both the V- and H-polarized wave side receivers.

7. A system as set forth in claim 6, wherein each of said V-polarized wave side receiver and said H-polarized wave side receiver comprises a demodulation circuit and a logical processing circuit for producing said data, both operatively connected to said inter-symbol interference compensating circuit, one of these receivers contains therein said single carrier recovery circuit and said single clock signal generator comprising a single bit timing recovery circuit, operatively connected to said demodulators and said logical processing circuits, for generating said single reproduced clock signal, said single carrier recovery circuit and said single bit timing recovery circuit operatively connected to said demodulation circuits of said V-polarized wave side receiver and said H-polarized wave side receiver and being commonly utilized by both receivers, both said demodulation circuits demodulate respective received signals by commonly using said single reproduced reference carrier, and both said logical processing circuits commonly use said reproduced clock signal to output said data of the first and second routes.

8. A system as set forth in claim 7, wherein modulation in each of said transmitters is achieved under a multiphase modulation method or a quadrature amplitude modulation method, while demodulation in each of said receivers is achieved under the multiphase phase modulation method or the quadrature amplitude modulation method, respectively.

9. A system as set forth in claim 8, wherein said system further comprises a common V- and H-polarized wave transmitter antenna and a common V- and H-polarized wave receiver antenna, said transmitter unit radiates said vector addition wave by means of said common V- and H-polarized wave transmitter antenna and the radiated vector addition wave is received at said receiver by means of said common V- and H-polarized wave receiver antenna.

10. A vector addition wave transmitter receiving a clock signal, comprising:
an intermediate frequency oscillator;
a local oscillator;

vertical side modulation means, operatively connected to receive the clock signal, to said intermediate frequency oscillator and said local oscillator, for producing a vertical side modulated wave from first and second data signals;

horizontal side modulation means, operatively connected to receive the clock signal, to said intermediate frequency oscillator and to said local oscillator, for producing a horizontal side modulated wave from third and fourth data signals; and combining and transmitting means, operatively connected to said vertical side modulation means and said horizontal side modulation means, for producing a vertical polarized wave from said vertical side modulated wave and a horizonal polarized wave from said horizontal side modulated wave and for combining the vertical and horizontal polarized waves and transmitting the combination as a vector addition wave.

11. A vector addition wave receiver, comprising:

means for receiving a vector addition wave and dividing it into a modulated vertical polarized wave and a modulated horizontal polarized wave;

carrier recovery means, operatively connected to said means for receiving, for reproducing a modulated IF carrier from the modulated vertically and horizontally polarized waves;

bit timing recovery means, operatively connected to said carrier recovery means, for producing a bit clock signal from the modulated IF carrier;

vertical polarized wave demodulator means, operatively connected to said means for receiving, said carrier recovery means and said bit timing recovery means, for demodulating the modulated vertically polarized wave with the modulated IF carrier;

horizontal polarized wave demodulator means, operatively connected to said means for receiving, said carrier recovery means and said bit timing recovery means, for demodulating the modulated horizontally polarized wave with the modulated IF carrier;

inter-symbol compensating means, operatively connected to said vertical polarized wave demodulator means and said horizontal polarized wave demodulator means, for suppressing intersymbol interference between the demodulated vertically polarized wave and the demodulated horizontally polarized wave, for suppressing interference between adjacent bits, and for suppressing interference between in-phase and quadrature phase channels in each side;

vertical decoder means, operatively connected to said inter-symbol compensating means and said bit timing recovery means, for producing first and second data signals from the compensated demodulated vertically polarized wave using the bit clock signal; and horizontal decoder means, operatively connected to said inter-symbol compensating means and said bit timing recovery means, for producing third and fourth data signals from the compensated demodulated horizontally polarized wave using the bit clock signal.

* * * * *

UNITED STATES PATENT AND TRADEMARK OFFICE
CERTIFICATE OF CORRECTION

PATENT NO. : 4,521,878

DATED : June 4, 1985

INVENTOR(S) : NORIYASU TOYONAGA

It is certified that error appears in the above-identified patent and that said Letters Patent is hereby corrected as shown below:

Col. 2, line 48, "data-" should be --data--.

Col. 8, line 65, "eaily" should be --easily--.

Col. 9, line 42, "haing" should be --having--.

Signed and Sealed this

Twenty-fourth Day of September 1985

[SEAL]

Attest:

DONALD J. QUIGG

Attesting Officer

Commissioner of Patents and Trademarks—Designate